United States Patent [19]

Rubin

[11] Patent Number: 5,037,260
[45] Date of Patent: Aug. 6, 1991

[54] LOCK AND HEXAGONAL NUT COMBINATION FOR MOUNTING VEHICLE WHEELS

[75] Inventor: Sol R. Rubin, Beverly Hills, Calif.
[73] Assignee: Masco Industries, Inc., Taylor, Mich.
[21] Appl. No.: 518,635
[22] Filed: May 1, 1990
[51] Int. Cl.$^5$ .............................................. F16B 37/08
[52] U.S. Cl. .................................. 411/432; 411/410; 411/910; 81/439
[58] Field of Search ............... 411/432, 410, 910, 427, 411/403; 81/436, 437, 439, 460, 461

[56] References Cited

U.S. PATENT DOCUMENTS

| | | | |
|---|---|---|---|
| 1,924,089 | 8/1933 | Croessant | 411/403 X |
| 3,191,466 | 6/1965 | Kawashima | 411/410 X |
| 3,216,302 | 11/1965 | Kluth | 411/427 |
| 3,354,757 | 11/1967 | Grimm et al. | 411/410 X |
| 4,079,643 | 3/1978 | Evans | 81/439 |
| 4,659,273 | 4/1987 | Dudley | 411/910 X |
| 4,693,655 | 9/1987 | Omori | 411/910 X |
| 4,869,633 | 9/1989 | Hayashi | 411/432 X |

FOREIGN PATENT DOCUMENTS 282483 8/1952 Switzerland ................ 411/403

Primary Examiner—Gary L. Smith
Assistant Examiner—Suzanne L. Dino
Attorney, Agent, or Firm—Dykema Gossett

[57] ABSTRACT

A system for mounting vehicle wheels is disclosed in which at least one lock nut secures the wheel upon lug bolts to prevent theft. The dimensions of the lock nut are selected such that a lock nut tool may also tighten and remove polygonal nuts that are used to secure the same wheel to the lug bolts. With this invention, a vehicle owner or a vehicle assembly line is not required to have two distinct type of tools, and the assembly line is not constrained to having the lock nut tightened at a particular lock nut tightening station.

20 Claims, 2 Drawing Sheets

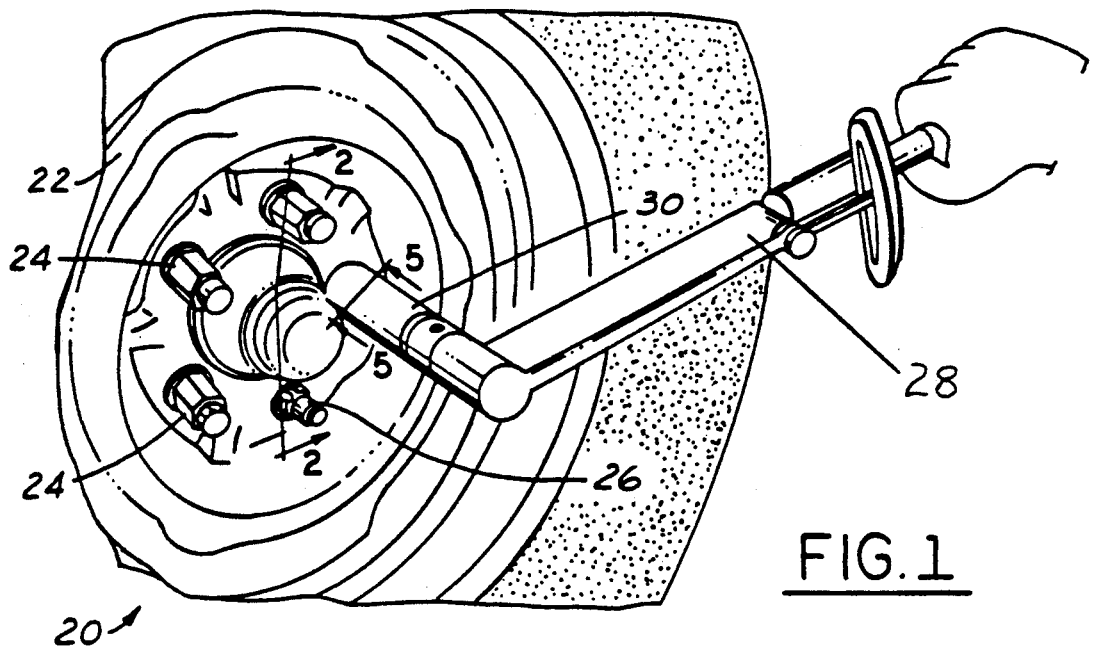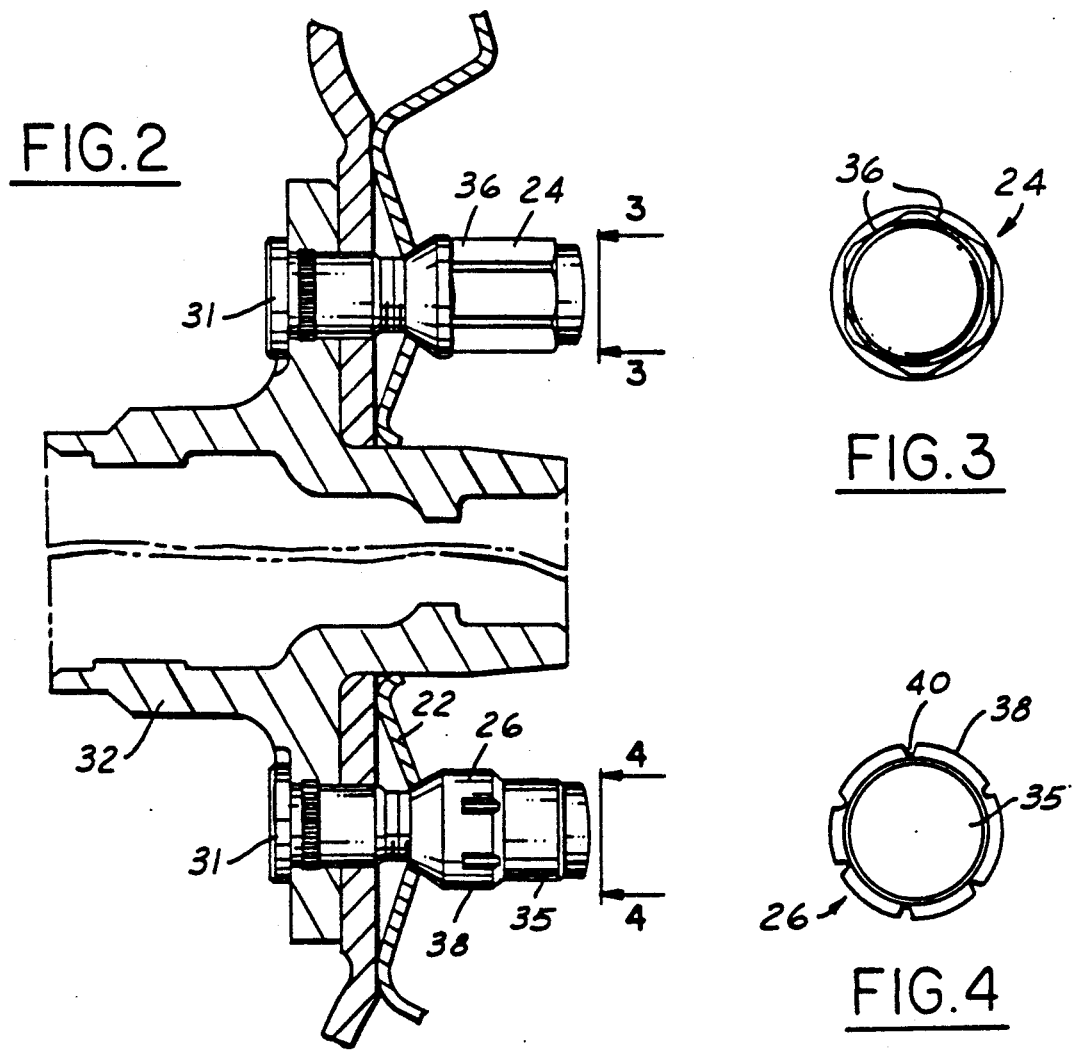

LOCK AND HEXAGONAL NUT COMBINATION FOR MOUNTING VEHICLE WHEELS

BACKGROUND OF THE INVENTION

The present invention relates to a system for attaching a vehicle wheel to a wheel hub with a plurality of nuts secured on lug bolts. More particularly, the invention relates to such a system where one of the nuts is a lock nut, having a wrench engaging surface that cannot be rotated by standard wrenches utilized to tighten or remove polygonal nuts.

Lock nuts are used to secure expensive wheels, such as aluminum alloy wheels, and prevent theft. A lock nut typically has a generally cylindrical outer periphery with a plurality of radially inwardly extending grooves. A tool having ribs that extend into the grooves is required to remove the lock nut. The width, length and circumferential position of the lock nut grooves defines a pattern that is varied periodically, such that a single lock nut tool cannot be utilized to remove all lock nuts. If a number of patterns are utilized, and varied periodically, a thief is prevented from easily removing the lock nut and the expensive wheel. As an example, if a total of ten different lock nut patterns are typically used, a thief would be required to have ten corresponding lock nut removing tools. The thief could not quickly remove the wheel, as there would be some time required to match the particular lock nut with a particular lock nut removing tool.

In a typical application, a single lock nut is utilized, with the remainder of the lug bolts receiving standard hexagonal nuts. The prior art lock nut tools will not rotate hexagonal nuts. With the prior art system, an owner of a vehicle must have a first tool to rotate the hexagonal nuts, and a second tool to rotate the lock nut.

The requirement of separate tools for the lock nut and the hexagonal nuts restricts the use of lock nuts in vehicle manufacturing plants. Vehicle manufacturing plants wish to simplify production, and eliminate as many distinct type of tools, or workstations, as possible. In assembling a vehicle wheel to the wheel hub with a prior art system that utilizes a single lock nut, a manufacturer must have two types of tools, and must maintain a dedicated assembly station equipped with the lock nut tool.

It is an object of the present invention to disclose a vehicle wheel mounting system in which a single tool may be utilized to tighten both a lock nut and the hexagonal nuts upon the lug bolts.

SUMMARY OF THE INVENTION

The present invention discloses a vehicle wheel mounting system and method in which the shape of a lock nut is selected such that a single type tool tightens or removes both the lock nut and a polygonal nut. In a disclosed embodiment of the present invention, a wrench engaging surface on the body of the lock nut has a plurality of grooves that extend into the body. The grooves are configured such that the cross-sectional outline of a polygonal nut utilized with the lock nut can be scribed onto a cross-sectional surface of the lock nut, with none of the groove crossing the outline.

A tool for removing the lock nut has ribs which correspond to the size and location of the grooves. Since the grooves do not cross the outline, these ribs also do not cross the outline. Thus, the ribs do not prevent the tool from being received on the polygonal nut. The tool may have a polygonal portion, separate from the ribbed portion, for rotating the polygonal nuts.

In a preferred embodiment, the grooves extend to terminate at the sides of the outline. With this embodiment, the ribs provide a nut engaging surface of the tool for both the lock nut and the polygonal nuts. In a most preferred embodiment of the present invention, the grooves extend radially inwardly from the outer periphery of the lock nut. Also, the polygonal nut is preferably hexagonal, and there are preferably six grooves on the lock nut.

These and other features and objects of the present invention can be best understood from the following specification and drawings, of which the following is a brief description.

BRIEF DESCRIPTION OF THE DRAWINGS

FIG. 1 is a partial perspective view of a vehicle wheel assembly.

FIG. 2 is a cross-sectional view through the vehicle wheel assembly along line 2—2 as shown in FIG. 1.

FIG. 3 is a front view of a hexagonal nut along line 3—3 as shown in FIG. 2.

FIG. 4 is a front view of a lock nut along line 4—4 as shown in FIG. 2.

DETAILED DESCRIPTION OF AN EMBODIMENT OF THE INVENTION

Figure 5:
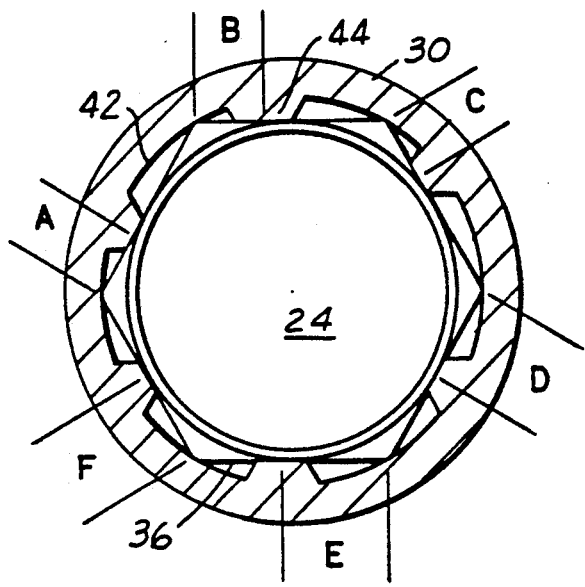
FIG. 5 is a cross-sectional view along line 5—5 as shown in FIG. 1, showing a tool removing a polygonal nut.

The present invention discloses vehicle wheel mounting system 20 illustrated in FIG. 1. Vehicle wheel 22 is received upon a plurality of lug bolts, which extend through openings in the wheel. Each lug bolt receives either hexagonal nuts 24, or a lock nut 26. Lock nut 26 is configured such that it cannot be removed by a standard tool for removing hexagonal nuts 24. Although hexagonal nuts are used in the disclosed embodiment, it should be understood that any polygonal shaped nut can be utilized within the teachings of this invention.

Tool 28 is equipped with socket 30, which is illustrated received upon a nut to tighten it upon a lug bolt. Socket 30, as disclosed by the present invention, can be utilized to tighten or remove hexagonal nuts 24, or lock nut 26.

FIG. 2 illustrates lug bolts 31 extending forwardly of wheel hub 32, which receives vehicle wheel 22. Vehicle wheel 22 may be an aluminum alloy type wheel, which is relatively expensive and thus subject to theft. Lug bolts 31 extend forwardly of hub 32, and pass through openings in wheel 22 to receive either hexagonal nut 24, or lock nut 26. The sides 36 of hexagonal nut 24, which are the wrench engaging surfaces of the nut, extend for a greater axial distance than the outer periphery 38 of lock nut 26, to provide a benefit that will be disclosed below.

FIG. 3 is a front view of a hexagonal nut 24. The outer periphery of the nut, which is formed by six sides 36, is defined as a wrench engaging surface.

FIG. 4 is a front view of lock nut 26, which has a plurality of wrench engaging grooves 40 extending from the cylindrical outer periphery 38 radially into the body of lock nut 26. Grooves 40 extend inwardly to the extent that the ends of grooves 40 are approximately the same distance from a center of lock nut 26, as the outer periphery of forward portion 35. This provides a benefit that will be discussed below.

FIG. 5 illustrates cylindrical socket 30 engaged over hexagonal nut 24. Socket 30 has an inner periphery 42, including a plurality of radially inwardly extending lock nut engaging ribs 44. In the illustrated embodiment there are six ribs, each in contact with an individual side 36 of hexagonal nut 24. It should be understood that the teachings of this invention extend to a tool and lock nut having either more, or less, ribs and grooves than the polygonal nut has sides. Ribs 44 are illustrated engaging sides 36 of hexagonal nut 24, however, this engagement is not necessary to effect the teachings of this invention. It is only necessary that ribs 44 do not extend to such an extent that they prevent receipt of hexagonal nut 24 within tool 30.

Ribs 44 are shown spaced at various distances A, B, C, D, E and F from the corners of hexagonal nut 24. The distances define relative circumferential positions for the six ribs 44. These distances may be varied, and the width and length of ribs 44 may also be varied, along with the corresponding positions, widths and lengths of grooves 40 in lock nut 26, to change the pattern of the lock nuts. In this way, wheel mounting system 20 may easily define several patterns of lock nuts, requiring a thief to have several distinct lock nut removing tools.

The opposed positioning of ribs 44 contacting sides 36 of hexagonal nut 24 allows socket 30 to remove the nut. When socket 30 is rotated, the opposed ribs 44 identified at the various distances A-F apply a torque to rotate hexagonal nut 24 on a lug bolt 31.

Figure 6:
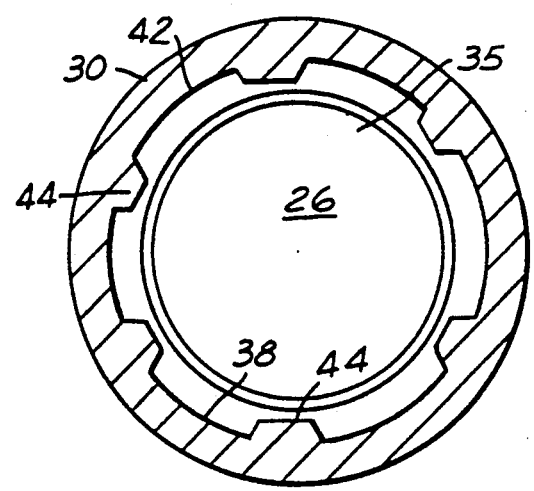
FIG. 6 is a view similar to FIG. 5, but showing the same tool removing a lock nut.

Socket 30 is shown in FIG. 6 received over lock nut 26. Each rib 44 is sized and positioned to correspond to a groove 40. An inner periphery 42 is received closely over outer periphery 38 of lock nut 26, and each rib 44 extends inwardly into a corresponding groove 40. By rotating tool 30, ribs 44, which are engaged in grooves 40, rotate lock nut 26 on a lug bolt 31. It should be understood that inner periphery 42 need not closely receive outer periphery 38 of lock nut 26. There may be clearance between the two surfaces, and they need not have the same shape.

The inventive lock nut configuration can be understood by comparing FIGS. 5 and 6. The outline of hexagonal nut 24 could be scribed on a surface of lock nut 26, with grooves 40 and ribs 44 contacting, but not crossing sides 36. More precisely, sides 36 could be said to divide lock nut outer periphery 38 into six adjacent equal angular arcs, with each side 36 defining a chord connecting the ends of an arc. Grooves 40 and ribs 44 are formed in the area between side 36 and the arc, without crossing the sides.

Figure 7:
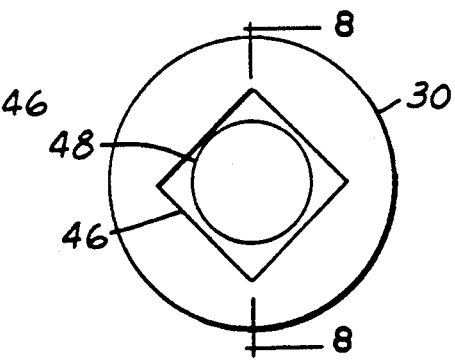
FIG. 7 is an end view of a tool as described by the present invention.

FIG. 7 is an end view of socket 30 and illustrates socket drive connection 46 at one end. A threaded lock connection 48, disposed axially intermediate socket 30, can be utilized to secure the tool upon a bolt when stored in the trunk of a vehicle.

Figure 8:
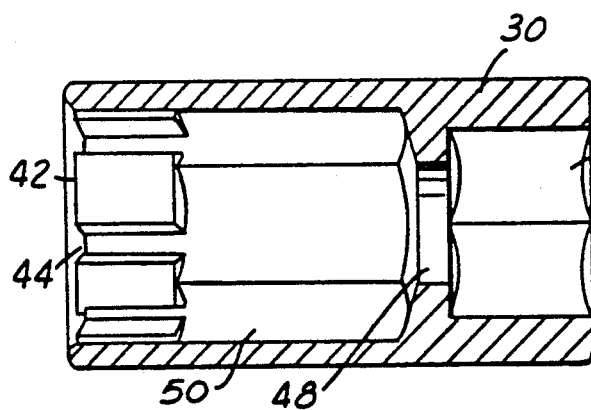
FIG. 8 is a cross-sectional view along line 8—8 as shown in FIG. 7.

FIG. 8 illustrates socket 30 with inner periphery 42 having radially inwardly extending lock nut engaging ribs 44. A hexagonal inner periphery portion 50 is axially spaced into socket 30 from inner periphery 42. As discussed above, hexagonal nut 24 has a wrench engaging surface which extends for a greater axial extent then the outer periphery 38 of lock nut 26. When using tool 30 on hexagonal nut 24, the nut may extend inwardly such that hexagonal inner periphery 50 drives the nut. With a tool having hexagonal inner periphery 50, it is not necessary for ribs 44 to actually contact sides 36 of hexagonal nut 24. Hexagonal inner periphery 50 could drive hexagonal nut 24 solely, without any assistance from ribs 44.

Hexagonal inner periphery 50 has sides at radial positions approximately equal to the inward extent of ribs 44, which correspond to grooves 40. As discussed above, the inner extent of grooves 40 is approximately equal to the diameter of forward portion 35, which extends into hexagonal inner periphery 50 when socket 30 is received on lock nut 26. Thus, hexagonal inner periphery 50 closely receives forward portion 35, and serves to align lock nut 26 within socket 30. Although hexagonal inner periphery 50 will not drive forward portion 35, it does assist in supporting the nut so that it is received in socket 30 over a sufficient axial distance to resist twisting or misalignment.

A method according to the present invention, will now be disclosed with reference to the figures. A wheel is mounted on lug bolts of a wheel hub. Nuts are placed on each bolt, with at least one nut being a lock nut, and at least one nut being a polygonal nut. Tool 30 is positioned on either hexagonal nut 24 or lock nut 26. When tightening lock nut 24, a lock nut engaging surface on the tool having ribs 44 is aligned with the ribs extending into grooves 40 in the lock nut. When tightening a hexagonal nut, a hexagonal nut engaging surface is aligned with hexagonal nut 26. The hexagonal nut engaging portion may be the same portion utilized to drive the lock nut, or alternatively a separate hexagonal inner periphery portion 50 may drive hexagonal nut 24.

Tool 28 is illustrated as a hand tool for the sake of simplicity. It should be understood, however, that a major benefit of this invention is the elimination of restrictions in a vehicle assembly plant and thus tool 28 could be incorporated into a station on a vehicle assembly line. Even if a tool having a plurality of sockets 30 to simultaneously tighten all of the nuts is used, eliminating the requirement of having two tool types, and matching the lock nut tool with the lock nut is a valuable benefit.

The present invention has been illustrated with a lock nut having a cylindrical outer periphery, and grooves extending radially inwardly to define a wrench engaging surface. The teachings of this invention, however, extend to a lock nut having a noncylindrical outer periphery, or a wrench engaging surface at an inner periphery of the nut, rather than the outer periphery. Any combination of a lock nut and polygonal nut would come under the teachings of this invention, in which a single tool may be utilized to tighten or remove both types of nuts.

The disclosed embodiment relates to a vehicle wheel mounting system, however, the teachings of this invention extend to other applications in which a plurality of nuts are utilized, with at least one nut having a wrench engaging configuration that cannot be utilized with a standard tool for removing the remainder of the nuts.

Preferred embodiments of the present invention have been disclosed, however, a worker of ordinary skill in the art would realize that certain modifications would come within the scope of this invention, and thus the following claims should be studied in order to determine the true scope and content of the present invention.

I claim:

1. A lock nut to be utilized in combination with a polygonal shaped nut, comprising:
a body including a wrench engaging surface defined by a plurality of grooves extending into said body to selected distances, such that the cross-sectional outline of the polygonal nut that the lock nut is to be utilized with can be scribed onto a cross-section of said body, said body having N grooves, the polygonal nut having M sides, said outline of the polygonal nut being such that M adjacent equal angular arcs are spaced about said body and defined by chords which interconnect the ends of each arc, said chords defining the sides of the polygonal nut in said outline, said grooves not crossing any of said sides.

2. A lock nut as recited in claim 1, wherein said body defining a generally cylindrical surface and said groove extending into said body from said cylindrical surface.

3. A lock nut as recited in claim 2, wherein said generally cylindrical surface is the outer periphery of said body.

4. A lock nut as recited in claim 3, wherein there are a plurality of said grooves extending into said body to selected distances, such that at least some of said grooves terminate at sides of said outline.

5. A lock nut as recited in claim 1, wherein said groove extends into said body from the outer periphery of said body.

6. A lock nut as recited in claim 1, wherein N equals M.

7. A lock nut as recited in claim 6, wherein said grooves extend into said body to selected distances, such that each of said grooves terminates at a side of said outline.

8. A lock nut to be utilized in combination with a polygonal shaped nut, comprising:
a body having a cylindrical peripheral surface including a wrench engaging surface defined by a plurality of grooves extending into said body from said cylindrical peripheral surface to selected distances, such that the cross-sectional outline of the polygonal nut that the lock nut is to be utilized with, can be scribed onto a cross-section of said body, said body having N grooves, the polygonal nut having M sides, said outline of the polygonal nut being such that M adjacent equal angular arcs are spaced about said cylindrical peripheral surface of said body and defined by chords which interconnect the ends of each arc, said chords defining the sides of the polygonal nut in said outline, said grooves not crossing any of said sides.

9. A lock nut as recited in claim 8, wherein N equals M.

10. A lock nut as recited in claim 9, wherein M equals 6.

11. A lock nut as recited in claim 10, wherein each said groove extends from said cylindrical peripheral surface and terminates in contact with one of said sides.

12. A lock nut as recited in claim 11, wherein said cylindrical peripheral surface is the outer periphery of said body.

13. A wheel mounting system comprising:
a plurality of nuts, including at least one hexagonal nut having six sides and at least one lock nut, said lock nut having an outer periphery and six grooves extending inwardly from said outer periphery;
a tool, being a generally hollow cylinder having six ribs extending radially inwardly from an inner periphery over at least a portion of the axial length of said tool, each of said ribs corresponding in width, length and circumferential position to the width, length and circumferential position of one of said grooves, said grooves and said sides of said hexagonal nut being dimensioned such that said tool can be received over said lock nut with corresponding ribs received in corresponding grooves, and said tool can also be received over said hexagonal nut, with each of said ribs contacting one of said sides for driving said hexagonal nuts.

14. A tool comprising:
a body having a lock nut engaging surface extending over at least a portion of the axial length of the tool, said lock nut engaging surface having ribs extending from said body which correspond in width, length and position to grooves on a lock nut, said tool further having a polygonal nut engaging surface sized to correspond to a polygonal nut, said lock nut engaging surface extending over only a portion of the axial length of the tool, a separate polygonal nut engaging surface extending from the end of said lock nut engaging surface.

15. A tool as recited in claim 14, wherein said body being a generally hollow cylinder, and said ribs extending inwardly from an inner periphery, said ribs being dimensioned such that said tool can be received over the lock nut with corresponding ribs received in corresponding grooves, and said tool can also be received over the polygonal nut, with each of said ribs contacting a side of the polygonal nut.

16. A tool as recited in claim 15, wherein said ribs extend from an axial end of said body to an intermediate position, a separate polygonal nut engaging surface corresponding to the shape of the polygonal nut extending from said intermediate position.

17. A tool as recited in claim 16, wherein there are six ribs on said body, said separate polygonal nut engaging surface having six sides.

18. A method of mounting a vehicle wheel to a wheel hub having a plurality of forwardly extending bolts, the wheel having a plurality of openings to receive the bolts, comprising the steps of:
placing the wheel on the wheel hub such that the bolts extend through the openings in the wheel, placing nuts on the bolts such that they may be tightened to secure the wheel to the wheel hub, with at least one polygonal nut and at least one lock nut being utilized, the polygonal nuts and the lock nuts having distinct shaped wrench engaging surfaces;
utilizing a single tool configured to tighten both a lock nut and a polygonal nut upon the bolts by aligning a lock nut engaging surface of a tool with the wrench engaging surface of a lock nut, when tightening a lock nut, or aligning a polygonal nut engaging surface of the tool with the wrench engaging surface of a polygonal nut, when tightening a polygonal nut, wherein the lock nut has a wrench engaging surface including a plurality of grooves extending into the lock nut, the tool having a plurality of ribs, each rib corresponding to one of the grooves in width, length and position, the alignment of the tool on a lock nut including aligning the ribs with corresponding grooves, and the alignment of the tool ion as polygonal nut including aligning the tool over the nut with each of the ribs contacting a side of the polygonal nut for driving the polygonal nut.

19. A method as recited in claim 18, wherein the lock nut engaging surface of the tool is also utilized as the polygonal nut engaging surface.

20. A method as recited in claim 18, wherein the polygonal nut engaging surface is at least partially a surface that is not a portion of the lock nut engaging surface.

* * * * *